Sept. 6, 1955 M. SWAN 2,717,368
TESTING APPARATUS

Filed May 18, 1953 2 Sheets-Sheet 1

INVENTOR.
MERRILL L. SWAN,
BY
Reed C. Lawlor
ATTORNEY.

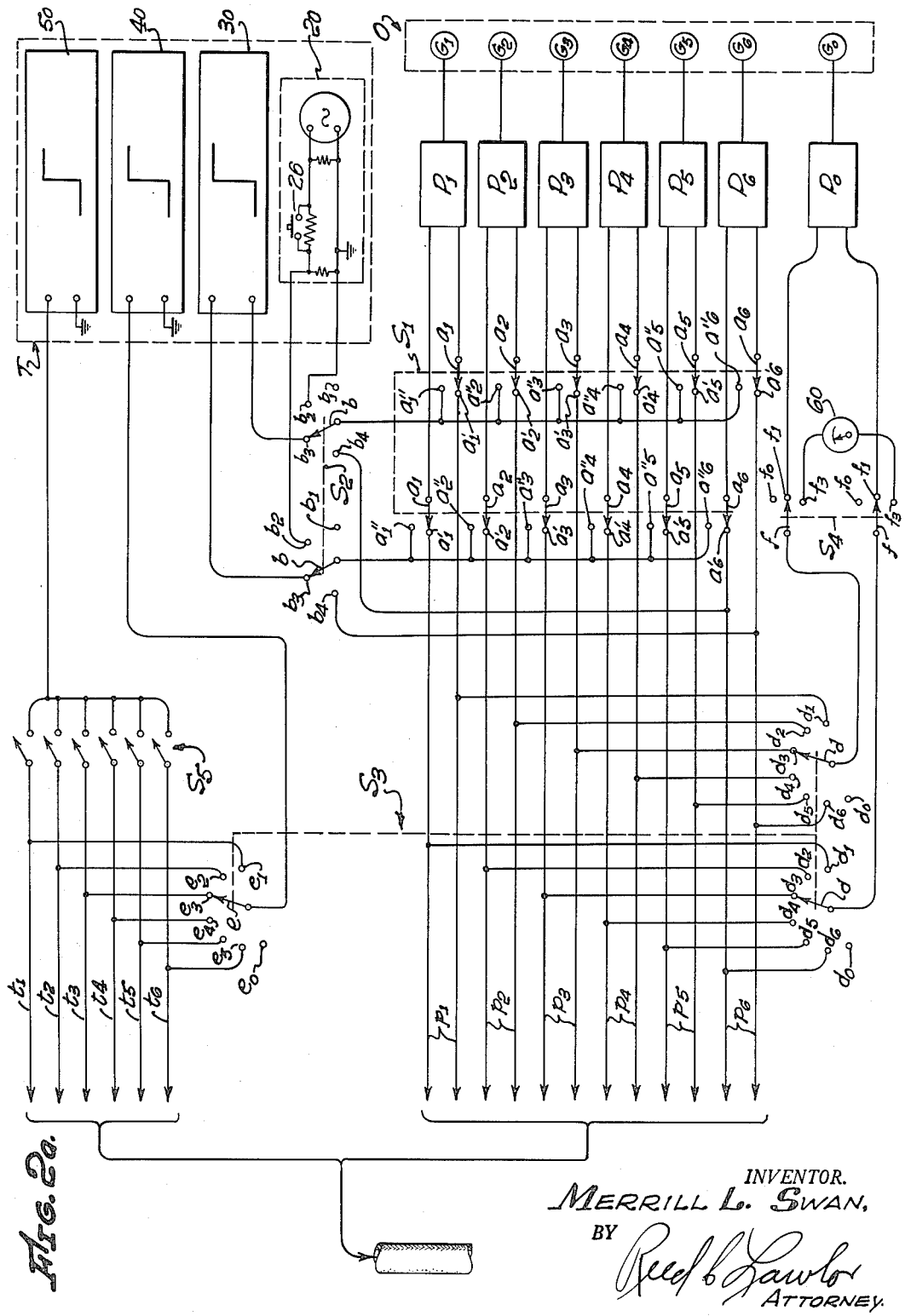

United States Patent Office 2,717,368
Patented Sept. 6, 1955

2,717,368

TESTING APPARATUS

Merrill Swan, Pasadena, Calif., assignor, by mesne assignments, to United Geophysical Corporation, Pasadena, Calif., a corporation of California Application May 18, 1953, Serial No. 355,508

9 Claims. (Cl. 340—15)

This invention relates to geophysical prospecting apparatus and more particularly to improvements in apparatus for reflection seismic surveying.

While this invention is applicable to other types of systems, it is described below in connection with a specific type of seismic prospecting apparatus, and even though the invention is described only in connection with that specific apparatus, it is to be understood that it may be applied to other apparatus without departing from its fundamental principles.

In a system of seismic prospecting described and claimed in copending patent application Serial No. 319,969, filed November 12, 1952, by Raymond A. Peterson, seismic waves are generated at a point in a shothole and, after being refracted and reflected from subsurface strata, the waves received at a series or string of geophones or seismometers in the form of hydrophones that are arranged in a vertical line in a receiver hole that has been drilled into the earth. The various hydrophones are located at different depths and they are connected by means of a cable to a series of recording devices at the surface of the earth. Each part of the system from hydrophone to recording device is sometimes referred to hereinafter as a separate channel.

In practice, in the particular system described in said copending application, the hydrophones include detecting elements in the form of piezo-electric crystals. These detecting elements are arranged to respond to changes in the perssure of fluid in the receiver hole. The voltages generated by the detecting elements are applied to the inputs of preamplifiers contained within the respective hydrophones and the amplified voltages appearing at the outputs of the preamplifiers applied to corresponding recorder amplifiers at the surface of the earth and the outputs of the amplifiers are applied to corresponding galvanometers of a multiple-element oscillograph.

In order to make accurate records of the seismic waves received by the respective hydrophones, it is desirable for all of the detecting elements, preamplifiers, corresponding amplifiers, and galvanometers to have the same frequency response characteristics. Unless they have such identical characteristics, erroneous information may be obtained respecting the relative times of arrival of various seismic waves at the different hydrophones.

The frequency responses of the hydrophones, that is, the combinations of piezo-electric detectors and preamplifiers, are determined very largely by the properties of the detecting elements and the input impedances of the preamplifiers. In practice, the output impedance of such a detecting element itself is very high. For this reason, in order to amplify the output of the detecting elements effectively, the input resistance of the preamplifier to which it is connected must be very high and, in practice, is made more than about a hundred megohms or so. Also, since the effects of transient waves must be recorded faithfully, the input capacitance of each of the preamplifiers is made very small and is often of the order of about 7 mmf. (micromicrofarads).

As a rule, the hydrophones are operated at a considerable depth in the receiver hole. Consequently, the external pressure exerted by the fluid on the hydrophone is very high. Occasionally small quantities of moisture leak through the seals of a hydrophone and reduce the effective input impedance into which the detecting element is operating.

It is therefore an object of this invention to provide a system for testing the hydrophones or other devices, including delicate detecting elements, while they are connected in series and even while in place in a borehole in the earth.

The overall frequency response of each of the channels from detector element to galvanometer depends not only upon the characteristic input impedances of the preamplifier in the hydrophone, but also upon the characteristics of the recorder amplifier. In practice, it is desirable not only to know whether a channel is defective, but to be able to locate the element or unit in which the defect exists and sometimes the nature of the defect.

It is therefor an object of this invention to provide a system for separately testing the electrical apparatus in the hydrophones and the electrical apparatus located at the surface.

The foregoing and other objects of the invention, together with various advantages thereof will be more readily understood from the following description, taken in connection with the accompanying drawings which are for purposes of illustration only and in which.

Figure 1:
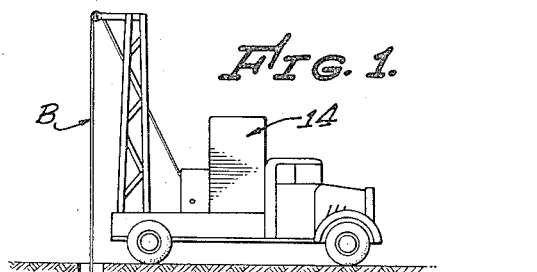
Figure 1 is a vertical cross-sectional view of the earth illustrating geophysical prospecting system to which this invention is applied.
Figure 2C:
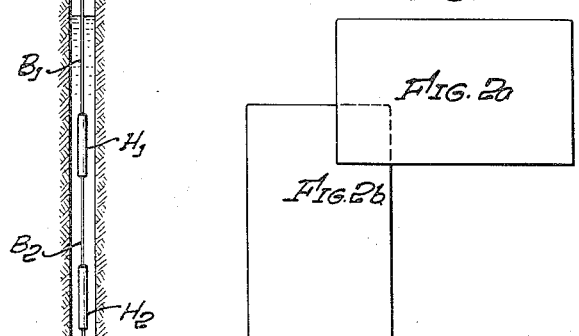
Fig. 2 is a schematic diagram illustrating an embodiment of the invention.
Figure 3:
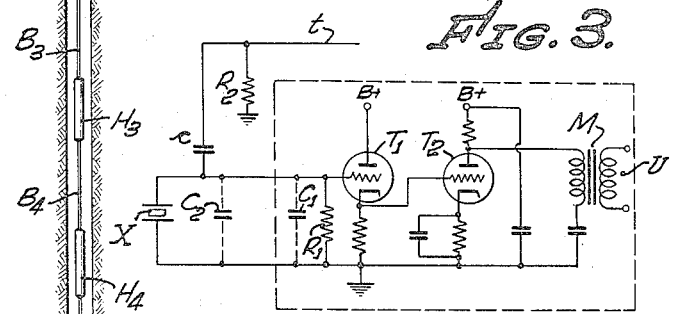
Fig. 3 is a detailed wiring diagram of a preamplifier and detecting element.
Figure 4:
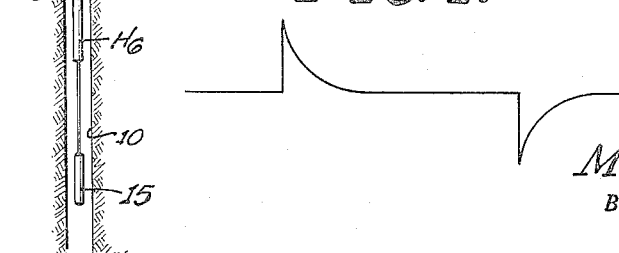
Fig. 4 is a graph representing an oscillograph representing the response of a hydrophone to a pair of step voltages.
Figure 2B:
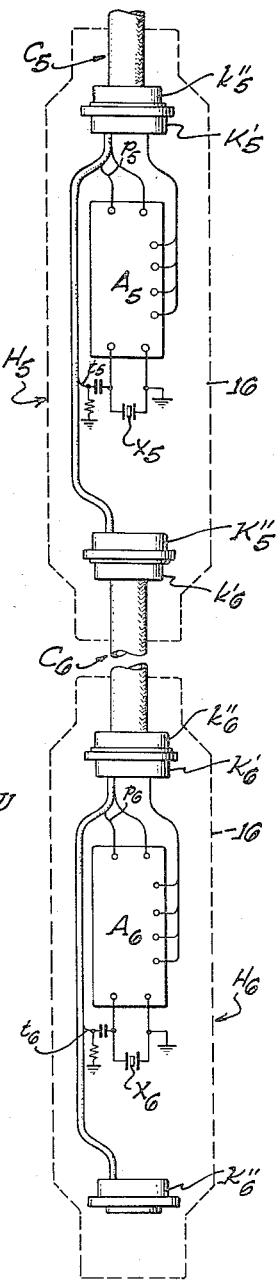

Referring to the drawings, and particularly to Figs. 1 and 2, there is illustrated a string of hydrophones $H_1 \ldots H_6$ connected together by means of a cable B and arranged in series in a receiver hole 10 filled with fluid. The hydrophones $H_1 \ldots H_6$ are connected to apparatus in a recorder truck 14 by means of a truck cable section $B_1$, and the hydrophones are connected together in the series by means of a series of interconnecting or jumper cable sections $B_2 \ldots B_6$. The hydrophones $H_1 \ldots H_6$ are arranged in the order mentioned from top to bottom. Likewise, the jumper sections $B_1 \ldots B_5$ are arranged in the order mentioned from top to bottom. The cables and the hydrophones are arranged alternately in the string so that uppermost jumper cable $B_2$ is connected between the first and second hydrophones $H_1$ and $H_2$, the second jumper cable $B_3$ is connected between the second and third hydrophones $H_2$ and $H_3$, etc. Interconnecting strength cables (not shown) are employed to support the hydrophones. A weight 15 is connected to the lowermost hydrophone $H_6$ by means of a strength cable. Usually the uppermost cable section $B_1$ is relatively long compared to the other cables $B_2 \ldots B_3$ and all of the latter cable sections are of the same length so that the hydrophones $H_1 \ldots H_6$ are uniformly spaced in the string. The uppermost cable section $B_1$ is arranged on a winch on the truck to enable the string of hydrophones to be lowered to any desired depth in the hole 10.

In use, as explained in said patent application, Serial No. 319,969 hereinbefore referred to, a train of seismic waves travelling upwardly in the earth arrives at the string of hydrophones and is detected by the hydrophones $H_6, H_5 \ldots H_1$ in turn, being received by the lowermost hydrophone first and by the uppermost hydrophone last. As the waves are detected at each hydrophone, they are converted into corresponding electrical waves which are transmitted through the cables to the equipment on the truck 14 where the waves received at each hydrophone are recorded by a particular galvanometer, thereby producing a multiple-trace seismogram on which the relative times of arrival of the waves at different hydrophones are indicated.

In practice, the process described above is repeated at different points of the earth that are spaced apart on a horizontal line, thereby producing a series of seismograms representing waves that have been returned toward the surface of the earth from different parts of various subsurface strata. The relative times of arrival of the waves on one record or on several records are employed to determine the nature of the subsurface formations.

A hydrophone of the type to which the present application is applicable is described and claimed in copending patent application, Serial No. 366,030, filed July 3, 1953, by Edgar T. Howes and William F. Hoy. As more fully explained in that application, each of the hydrophones H includes a sealed casing 16 in which is mounted a piezo-electric detector X, a preamplifier A, an upper, or output, male connector K' and a lower, or input, male connector K''. Each piezo-electric detector X is subjected to the influence of changes of pressure in the well fluid, thereby producing corresponding electromotive forces which are applied to the input of the corresponding preamplifier A. The resultant amplified signals lead through conductors connected to the output of the preamplifier A to contacts in the upper connector K' of each hydrophone. In order to facilitate transmission of signals from a lower hydrophone through the upper hydrophones, contacts in each lower connector K'' are connected to contacts in the upper connector K' by means of insulated wires within the hydrophone casing.

Each of the cable sections $B_2 \ldots B_6$ is provided with a lower female connector $k''$ which is mated with the upper male connector K' of the hydrophone beneath it. Each of the cable sections $B_2 \ldots B_6$ also comprises a similar upper female connector $k'$ which is mated with the lower male connector K'' of the hydrophone directly above it. The cable sections are in the form of multiple-conductor cables and the contacts of the lower and upper connectors of the respective cable sections are interconnected by these conductors. Corresponding conductors in the truck cable section $B_1$ are also employed. As a result, in effect, the hydrophones are connected together by means of a cable B made up in part by the conductors in the respective cable sections and the wires which connect the lower and upper connectors K' and K'' of the hydrophones. In order to lead signals from each of the hydrophones $H_1 \ldots H_6$ to the recording apparatus at the surface, some of these conductors terminate in the respective hydrophones, while other conductors pass through the hydrophones.

The detecting element X of each hydrophone is connected to the input of a preamplifier A that comprises two stages including amplifying tubes $T_1$ and $T_2$ respectively, as indicated in detail in Fig. 2. The grid circuit of the first amplifying tube $T_1$ includes a grid-leak resistor $R_1$ having a value of the order of several hundred megohms. Effectively shunting this resistor $R_1$ is the stray capacitance $C_1$ due to the input leads and the like. In shunt also is the effective capacitance $C_2$ of the crystal detector element X itself. The first amplifying tube $T_1$ is cathode-loaded and its output is applied to the second amplifying tube $T_2$, the output of which is applied to a transformer M having terminals at its output U. One side of the input of each preamplifier A is grounded, while the other side is ungrounded. The effective stray capacitance $C_1$ of a preamplifier and its associated input leads are typically about 7 mmf. while the effective capacitance $C_2$ of a piezo-electric detecting element X may be of the order of 100 mmf. Each of the preamplifiers A has a substantially uniform frequency response characteristic above about ten cycles per second.

The recording apparatus in the truck 14 includes a series of amplifiers $P_1, P_2 \ldots P_6$. The outputs of these amplifiers are connected, respectively, to galvanometer elements $G_1 \ldots G_6$ of a multiple-element oscillograph O. The various recorder amplifiers $P_1 \ldots P_6$ comprise AVC loops, including AVC networks, to limit the amplitudes of the traces produced by the galvanometers $G_1 \ldots G_6$. A monitor amplifier $P_0$ having its output connected to another galvanometer element $G_0$ is also employed. The galvanometer elements $G_0 \ldots G_6$ are all arranged in a series in a multiple-element oscillograph. The recorder amplifiers and galvanometers are designed to amplify seismic waves in a limited band, as a band from about 20 C. P. S. to 120 C. P. S. But the monitor amplifier and galvanometer are designed to have a flat response characteristic from about 3 C. P. S. to about 5,000 C. P. S. The truck apparatus also includes testing equipment T for testing the hydrophones $H_1 \ldots H_6$ and the recorder amplifiers $P_1 \ldots P_6$.

The cable B includes, among others, six pairs of conductors $p_1 \ldots p_6$ by means of which the outputs of the respective preamplifiers $A_1 \ldots A_6$ may be connected simultaneously to the inputs of the respective recorder amplifiers $P_1 \ldots P_6$ or individually to the monitor amplifier $P_0$. The lower ends of the respective pairs of conductors $p_1 \ldots p_6$ terminate at the outputs U of the respective preamplifiers $A_1 \ldots A_6$. Thus, the first pair of conductors $p_1$ are led through the cable B to the first hydrophone $H_1$ where they terminate at the output of the first preamplifier $A_1$. The remaining pairs of conductors, however, lead through various hydrophones to the corresponding hydrophones in which they terminate. Thus, for example, the pair of conductors $p_5$ is led through the truck cable section $B_1$, the uppermost hydrophone $H_1$, the first jumper cable section $B_2$, the second hydrophone $H_2$, the third jumper cable $B_3$, the third hydrophone $B_3$, the fourth jumper cable section $B_4$, the fourth hydrophone $H_4$, the fifth cable section $B_5$, and into the fifth hydrophone $H_5$ where they terminate at the output $U_5$ of the fifth preamplifier $A_5$. The cable B also includes test conductors $t_1 \ldots t_6$ which are led similarly through the various cable sections into the corresponding hydrophones $H_1 \ldots H_6$ terminating, respectively, on the ungrounded sides of the inputs of the respective preamplifiers. As explained more fully hereinafter, signals from the testing device T are applied through the test conductors $t_1 \ldots t_6$ to test the hydrophones.

Other conductors (not shown) are employed to lead power through the cables from a power supply (not shown) in the truck to the preamplifiers $A_1 \ldots A_6$.

In practice, as indicated in Fig. 2, each of the test conductors $t$ is connected to the input of each of the corresponding preamplifiers A through a small coupling condenser $c$ mounted within the corresponding hydrophone. Each of the test conductors $t$ is also connected at its lowermost end to one side of a resistor $R_2$, the other side of which is grounded.

A bridle switch $S_1$ that possesses a plurality of ganged pairs of movable arms $a$ that are selectively operable between first and second positions is employed to connect the respective recorder amplifiers $P_1 \ldots P_6$ to the upper ends of the respective pairs of output conductors $p_1 \ldots p_6$ and to connect the inputs of all of the amplifiers $P_1 \ldots P_6$ in parallel with a source switch $S_2$. The pairs of arms $a_1 \ldots a_6$ are connected, respectively, to corresponding pairs of terminals at the inputs of the recorder amplifiers $P_1 \ldots P_6$.

In one position each pair of arms $a$ of the bridle switch $S_1$ closes a pair of contacts $a'$ connected to the upper ends of the corresponding pair of output conductors $p$. Thus when the bridle switch $S_1$ is in its first position, the pairs of output conductors $p_1 \ldots p_6$ are connected, respectively, to the inputs of the recorder amplifiers $P_1 \ldots P_6$. Hence when the bridle switch $S_1$ is in its first position, the outputs of the various preamplifiers $A_1 \ldots A_6$ are connected directly to the inputs of the recorder amplifiers $P_1 \ldots P_6$. When in this condition a seismogram may be made representing the seismic waves that are received by the string of hydrophones. When the bridle switch $S_1$ is in its second position, each pair of movable arms $a_1 \ldots a_6$ closes a second pair of contacts $a''$ which are connected, respectively, to a pair of movable arms $b$ of the source switch $S_2$.

The source switch $S_2$ is provided with four pairs of contacts $b_1 \ldots b_4$ which are contacted, respectively, by movement of the arms $b$ to any one of four corresponding positions. The first pair of contacts $b_1$ is not connected electrically to any part of the apparatus and serves as "off" contacts.

The contacts $b_2$ of the second pair are connected to the output of a signal generator 20 which is adapted to generate electrical waves of a frequency of interest in seismic prospecting, such as waves having a frequency lying in the band between about ten cycles per second and about 200 cycles per second. The signal generator 20 comprises an oscillator 22 and means including a resistor pad 24 and a switch 26 for suddenly changing the amplitude of the signal appearing at the output thereof which is applied to the contacts $b_2$ of the source switch $S_2$. Both the amplitude and the frequency of the oscillator 22 are adjustable. This type of signal generator is adapted not only to test the frequency response characteristics of the various recorder amplifiers $P_1 \ldots P_6$, but also the effective attack and recovery time constants of the AVC networks associated therewith. In the third position, the movable arms $b$ close contacts $b_3$ which are connected to the output of a step-wave generator 30 which is adapted to produce, at the will of the operator, a sudden change of D. C. voltage at its output. This step-wave generator may therefore be employed to test the transient response of the amplifiers.

In their fourth position, the arms $b$ close contacts $b_4$ which are connected to the upper ends of a pair of output conductors, such as the conductors $p_6$ which are connected to the output of the preamplifier $A_6$ in the lowermost hydrophone $H_6$.

When the bridle switch $S_1$ is in its second position, all of the recorder amplifiers $P_1 \ldots P_6$ may be tested simultaneously with waves supplied thereto through the source switch $S_2$. More particularly, if the source switch $S_2$ is placed in its second position, waves from the signal generator 20 may be applied to the amplifiers $P_1 \ldots P_6$. When the source switch $S_2$ is turned to its third position, step waves may be applied to all of the recorder amplifiers $P_1 \ldots P_6$ from the step-wave generator 30. And when the source switch $S_2$ is set in its fourth position, seismic waves received by the hydrophone $H_6$ may be applied to all of the recorder amplifiers $P_1 \ldots P_6$. In any event, when the source switch $S_2$ is set in its second, third, or fourth position, a recording may be made by means of the oscillograph 0 of the outputs of the respective amplifiers $P_1 \ldots P_6$. The oscillograms so produced are examined to determine whether all of the amplifiers $P_1 \ldots P_6$ are functioning properly and in the same manner.

A channel selector switch $S_3$ is employed for testing the individual hydrophones. The selector switch $S_3$ is provided with three ganged arms that are selectively movable to any one of seven positions. Two of the arms $d$ operate as output selectors and the remaining arm $e$ operates as a testing selector. In each of the first six positions, the pair of output selector arms $d$ close pairs of contacts $d_1 \ldots d_6$ which are connected, respectively, to the upper ends of the pairs of output conductors $p_1 \ldots p_6$. Similarly, in each of the first six positions, the testing arm $e$ closes one of contacts $e_1 \ldots e_6$ which are connected, respectively, to the upper ends of the test conductors $t_1 \ldots t_6$. In the seventh position, all of the movable arms $d$ and $e$ of the channel selector switch $S_3$ are in an "off" position where they contact "off" contacts $d_0$ and $e_0$.

The pair of movable arms $d$ of the channel selector switch $S_3$ are connected to movable arms $f$ of a meter selector switch $S_4$ that is selectively movable between three positions. In the first position, the movable arms $f$ make contact with contacts $f_0$ which are not connected to any parts of the apparatus, therefore creating an "off" condition. In the second position, the arms $f$ close contacts $f_1$ which are connected to the input terminals of the monitor amplifier $P_0$. In the third position, the arms $f$ close contacts $f_3$ which are connected to an ohmmeter 60.

The monitor amplifier $P_0$ has an input impedance equal to that of each of the recorder amplifiers $P_1 \ldots P_6$. However, as mentioned before, the frequency response characteristic of the monitor amplifier is very flat, being substantially uniform above about three cycles per second.

To test the hydrophones individually, the bridle switch $S_1$ is first set in the second position, thereby disconnecting the recorder amplifiers $P_1 \ldots P_6$ from the output conductors. The meter selector switch $S_4$ is then set in its second position. While the meter switch $S_4$ is so set, the channel selector switch $S_3$ is adapted to connect the step-wave generator 40 to the input of any one of the preamplifiers $A_1 \ldots A_6$ and the monitor amplifier $P_0$ to the output of the same amplifier according to the position selected. The step-wave generator 40 is of any suitable type adapted to suddenly change the value of the direct current voltage appearing at its output.

With the channel selector switch $S_3$ so positioned, a step voltage may be applied to any one of the preamplifiers and the resulting response of the preamplifier recorded on the monitor galvanometer $G_0$. When a step voltage is applied to the input of a preamplifier $A$, an electric charge is applied directly across the detecting element $X$. The amount of the charge attains its full value almost instantly, inasmuch as the effective attack or rise-time constant of the circuit connected to the test conductor $T$ is less than about 0.0001 second. The charge impressed upon the detecting element $X$ gradually leaks off through the grid-leak resistor $R_1$ as well as through any shunt resistive path that may exist in parallel with the grid-leak resistor $R_1$.

As the charge leaks off the piezo-electric detector, the voltage impressed upon the input of the monitor amplifier $P_0$ gradually decreases. With the circuit constants mentioned, decrement of the voltage as indicated by the oscillograph trace made by the monitor galvanometer $G_0$ is about 0.033 second. If any substantial amount of moisture has leaked into the hydrophone under test, the decrement is considerably less. This change in decrement may be due, for example, to a decrease in the effective shunt resistance in parallel with the grid-leak resistor $R_1$. Thus, an examination of the oscillograph traces produced by testing the hydrophones in the manner described above makes it possible to determine whether there has been any leakage of moisture or whether the detecting elements and preamplifiers have become disabled electrically for any other reason.

By virtue of the fact that the outputs of the respective preamplifiers are recorded on the same galvanometer only after amplification by a common broad band amplifier $P_0$, comparisons are readily made between the hydrophones to determine whether or not they are all operating satisfactorily and uniformly.

If one of the preamplifier circuits is found to be faulty, as indicated by the record made with the monitor galvanometer $G_0$, the meter selector switch $S_4$ is moved to its third position, thereby connecting the ohmmeter to the output of the faulty preamplifier. Tests with such an ohmmeter or other measuring device are helpful in locating the exact point of the fault.

An auxiliary test switch $S_5$ is employed to simultaneously test the overall response of the various channels. The test switch $S_5$ comprises six ganged switches having their movable arms connected respectively to the upper ends of the test conductors $t_1 \ldots t_6$ which are movable between a first or open position to a second or closed position. When the test switch $S_5$ is in the closed position, all of the test conductors $t_1 \ldots t_6$ are connected to a common step-wave generator 40. This generator 40 too is adapted to produce a sudden change in D. C. voltage at its output. When the test switch $S_5$ is in its closed position and the bridle switch $S_1$ is in its first position, a signal generated by the step-wave generator 50 is simultaneously applied to the inputs of all the preamplifiers $A_1 \ldots A_6$. The resulting signals appearing at the outputs of the respective preamplifiers $A_1 \ldots A_6$ are applied to the inputs of the corresponding recorder amplifiers $P_1 \ldots P_6$ and are recorded by the respective galvanometers $G_1 \ldots G_6$. In this way overall indications of the transient response of the various channels are produced.

In the specification and drawing subscripts $1 \ldots 6$ have been employed to designate identical parts in different channels and subscripts have often been omitted where the description applies equally to all channels. Among the symbols with which such subscripts have been so employed are H, K, $k$, A, X, P, G, $p$, $t$, $c$, $a$, $a'$, $a''$, $d$ and $e$.

From the foregoing description it appears that a system has been provided for selectively testing the various hydrophones and the recorder amplifiers associated therewith. This system is adaptable for making different kinds of tests and is useful in testing the hydrophones while they are connected in a string and even while they are in a place in a receiver hole.

While the invention has been described with particular reference to the use of particular types of signal generators and the making of certain types of tests, it will be understood that other types of signal generators may be employed and that other tests may be made, all as will now readily appear to those skilled in the art. It is therefore to be understood that the invention is not limited to the specific embodiment thereof described herein, but may be embodied in many different forms coming within the scope of the appended claims.

While the invention has been described only with reference to the testing of hydrophones employing piezo-electric crystal detectors and preamplifiers, it will be understood that it may also be employed to test a series of other detecting elements which are lowered into a borehole in order to make tests or observations therein.

The invention claimed is:

1. In combination: a series of hydrophones each comprising a sealed case, each hydrophone having a piezoelectric detector element and a preamplifier mounted therein, the detector element of each hydrophone being connected to the input of the preamplifier of said hydrophone; a multiple-conductor cable interconnecting said hydrophones, said cable having a plurality of test conductors terminating at their lower ends at the respective detector elements, said cable also having a plurality of pairs of output conductors terminating at their lower ends at the outputs of the respective preamplifiers; a measuring device; a source of test signals; and a channel selector switch, said selector switch including a movable testing arm associated with a plurality of testing contacts and a pair of movable output arms associated with a plurality of pairs of output contacts, said movable arms being ganged, said testing arm being connected to said source of test signals, said output arms being connected to said measuring device, said plurality of test conductors terminating at their upper ends at corresponding testing contacts, said plurality of pairs of output conductors terminating at their upper ends at corresponding pairs of output contacts, whereby said measuring device and said signal source may be selectively connected respectively to the outputs of said amplifiers and to the detector elements at the respective inputs thereof.

2. In combination: a series of hydrophones each comprising a sealed case, each hydrophone having a piezoelectric detector element and a preamplifier mounted therein, the detector element of each hydrophone being connected to the input of the preamplifier of said hydrophone; a multiple-conductor cable interconnecting said hydrophones, said cable having a plurality of test conductors terminating at their lower ends at the respective detector elements, said cable also having a plurality of pairs of output conductors terminating at their lower ends at the outputs of the respective preamplifiers; a measuring device; a source of test signals; a channel selector switch, said selector switch including a movable testing arm associated with a plurality of testing contacts and a pair of movable output arms associated with a plurality of pairs of output contacts, said movable arms being ganged, said testing arm being connected to said source of test signals, said output arms being connected to said measuring device, said plurality of test conductors terminating at their upper ends at corresponding testing contacts, said plurality of pairs of output conductors terminating at their upper ends at corresponding pairs of output contacts, whereby said measuring device and said signal source may be selectively connected respectively to the outputs of said amplifiers and to the detector elements at the respective inputs thereof, a recorder including a plurality of recorder units, a signal generator, a source switch having a plurality of pairs of contacts, one pair of said source switch contacts being connected to the upper ends of one pair of said output conductors, a second pair of said source switch contacts being connected to said signal generator, and a bridle switch movable between first and second positions for selectively closing first and second sets of contacts respectively, said bridle switch being adapted in said first position to connect said recorder units to the upper ends of the pairs of conductors connected to corresponding preamplifiers whereby seismic waves received by the detector elements may be recorded by the respective recorder units, said bridle switch being adapted in said second position to connect the inputs of said recorder units to said source switch.

3. In combination: a series of detector units each comprising a detector element and a preamplifier mounted in a separate sealed case, the detector element of each detector unit being connected to the input of the preamplifier of said detector unit, said sealed case having a pair of multiple-contact electrical connectors at opposite ends thereof, wires connecting certain of the upper and lower connectors of each detector unit, a wire connecting the input of said preamplifier with a contact of the upper connector thereof, and wires connecting the output of said preamplifier with contacts of the upper connector thereof; multiple-conductor cables arranged between successive detector units, each cable section having connectors at the respective ends thereof mated with corresponding connectors of the adjacent detector units, the wires of said detector units forming with said sable sections a set of test conductors and a set of output conductors, the test conductors terminating at their lower ends at the respective detector elements, the output conductors terminaing at their lower ends at the outputs of the respective preamplifiers; a measuring device; a source of test signals; and a channel selector switch, said selector switch including a movable testing arm associated with a set of testing contacts and a movable output arm associated with a set of output contacts, said movable arms being ganged, said testing arm being connected to said source of test signals, said output arm being connected to said measuring device, said set of test conductors terminating at their upper ends at corresponding testing contacts, said set of output conductors terminating at their upper ends at corresponding pairs of output contacts, whereby said measuring device and said signal source may be selectively connected respectively to the outputs of said amplifiers and to the detector elements at the respective inputs thereof.

4. In combination: a series of detector units each comprising a detector element and a preamplifier mounted in a separate sealed case, the detector element of each detector unit being connected to the input of the preamplifier of said detector unit, said sealed case having a pair of multiple-contact electrical connectors at opposite ends thereof, wires connecting certain of the upper and lower connectors of each detector unit, a wire connecting the input of said preamplifier with a contact of the upper connector thereof, and wires connecting the output of said preamplifier with contacts of the upper connector thereof; multiple-conductor cables arranged between successive detector units, each cable section having connectors at the respective ends thereof mated with corresponding connectors of the adjacent detector units, the wires of said detector units forming with said cable sections a set of test conductors and a set of output conductors, the test conductors terminating at their lower ends at the respective detector elements, the output conductors terminating at their lower ends at the outputs of the respective preamplifies; a measuring device; a source of test signals; a channel selector switch, said selector switch including a movable testing arm associated with a set of testing contacts and a movable output arm associated with a set of output contacts, said movable arms being ganged, said testing arm being connected to said source of test signals, said output arm being connected to said measuring device, said set of test conductors terminating at their upper ends at corresponding testing contacts, said set of output conductors terminating at their upper ends at corresponding pairs of output contacts, whereby said measuring device and said signal source may be selectively connected respectively to the outputs of said amplifiers and to the detector elements at the respective inputs thereof; a series of reproducing devices; and a bridle switch movable between first and second positions, said bridle switch being adapted in said first position to connect said reproducing devices to the upper ends of the respective output conductors whereby signals detected by said detecting units may be separately reproduced by the respective reproducing devices, said bridle switch being adapted in the second position to disconnect said reproducing devices from said output conductors.

5. In combination: a string of detector elements; a multiple-conductor cable, said cable having a plurality of test conductors terminating at their lower ends at the respective detector elements, said cable also having a plurality of output conductors terminating at their lower ends at the respective detector elements; a measuring device; a source of test signals; and a channel selector switch, said selector switch including a movable testing arm associated with a plurality of testing contacts and a movable output arm associated with a plurality of output contacts, said movable arms being ganged, said testing arm being connected to said source of test signals, said output arm being connected to said measuring device, said plurality of test conductors terminating at their upper ends at corresponding testing contacts, said plurality of output conductors terminating at their upper ends at corresponding output contacts, whereby said measuring device and said signal source may be selectively connected respectively to the output conductor and to the test conductor associated with any one of the detector elements.

6. In combination: a detector unit for detecting conditions in a bore hole, said detector element having both an input and an output; a cable connected to said detector unit for suspending said detector element in a bore hole, said cable having a test conductor terminating at its lower end at the input of said detector unit, said cable also having an output conductor terminating at its lower end at the output of said detector unit; means for raising and lowering said cable and said detector unit in a bore hole; a source of test signals located at the surface; means for connecting said source to said test conductor for determining the characteristics of said detector unit while in said bore hole; and measuring means located at the surface and connectible to said output conductor for measuring such a condition and said characteristics.

7. In combination: a plurality of detector units for detecting conditions in a bore hole, each said detector unit having both an input and an output; a cable interconnecting said detector units for suspending said detector units at mutually spaced points in a bore hole, said cable having a plurality of test conductors terminating at their lower ends at the inputs of the respective detector units, said cable also having a plurality of output conductors terminating at their lower ends at the outputs of the respective detector units; means for raising and lowering said cable and said detector units in a bore hole; a source of test signals located at the surface; means for connecting said source to said test conductors for determining the characteristics of said detector units while in said bore hole; and measuring means located at the surface and connectable to said output conductors for measuring such a condition and said characteristics.

8. In combination: a plurality of detector units for detecting conditions in a bore hole, each said detector unit having both an input and an output; a cable interconnecting said detector units for suspending said detector units at mutually spaced points in a bore hole, said cable having a plurality of test conductors terminating at their lower ends at the inputs of the respective detector units, said cable also having a plurality of output conductors terminating at their lower ends at the outputs of the respective detector units; means for raising and lowering said cable and said detector units in a bore hole; a source of test signals located at the surface; means for connecting said source to any one of said test conductors for determining the characteristics of the corresponding detector unit while in said bore hole; a measuring device located at the surface; means for connecting said measuring device to the output conductor of a detector unit to measure said characteristics; and means located at the surface for measuring such a condition detected by the various detector units.

9. In combination: a plurality of detector units for detecting conditions in a bore hole, each said detector unit having an input and an output; means including a cable for supporting said detector units at mutualyl spaced points in a bore hole; a source of test signals located at the surface; means for selectively connecting said source to the input of any one of said detector units; a measuring device located at the surface; and means for selectively connecting said measuring device to the output of any one of said detect units.

References Cited in the file of this patent

UNITED STATES PATENTS

| | | |
|---|---|---|
| 2,473,314 | Toulon | June 14, 1949 |
| 2,591,177 | Mayne | Apr. 1, 1952 |
| 2,591,192 | Parr | Apr. 1, 1952 |
| 2,648,979 | Cornett | Aug. 18, 1953 |
| 2,653,305 | De Shazo | Sept. 22, 1953 |